United States Patent [19]
Seery

[11] Patent Number: 5,938,819
[45] Date of Patent: Aug. 17, 1999

[54] BULK SEPARATION OF CARBON DIOXIDE FROM METHANE USING NATURAL CLINOPTILOLITE

[75] Inventor: Major W. Seery, Lakewood, Colo.

[73] Assignee: Gas Separation Technology LLC, Golden, Colo.

[21] Appl. No.: 09/103,797

[22] Filed: Jun. 24, 1998

Related U.S. Application Data

[60] Provisional application No. 60/050,683, Jun. 25, 1997.

[51] Int. Cl.[6] .................................................. B01D 53/04
[52] U.S. Cl. ................................. 95/104; 95/139; 95/902
[58] Field of Search .......................... 95/104, 105, 139, 95/902, 97, 95

[56] References Cited

U.S. PATENT DOCUMENTS

| | | | |
|---|---|---|---|
| 3,237,377 | 3/1966 | Skarstrom | 95/139 X |
| 3,594,986 | 7/1971 | Schmid | 95/139 |
| 3,738,087 | 6/1973 | McCombs | 55/58 |
| 3,751,878 | 8/1973 | Collins | 95/105 |
| 3,885,927 | 5/1975 | Sherman et al. | 95/139 |
| 4,077,779 | 3/1978 | Sircar et al. | 55/25 |
| 4,171,206 | 10/1979 | Sircar | 55/26 |
| 4,264,340 | 4/1981 | Sircar et al. | 55/25 |
| 4,371,380 | 2/1983 | Benkmann | 95/139 X |
| 4,589,888 | 5/1986 | Hiscock et al. | 55/26 |
| 4,770,676 | 9/1988 | Sircar et al. | 55/26 |
| 4,775,396 | 10/1988 | Rastelli et al. | 55/58 |
| 4,784,672 | 11/1988 | Sircar | 55/26 |
| 4,857,083 | 8/1989 | Dimartino | 55/26 |
| 4,915,711 | 4/1990 | Kumar | 55/26 |
| 4,925,460 | 5/1990 | Coe et al. | 55/25 |
| 4,935,580 | 6/1990 | Chao et al. | 95/139 |
| 4,964,889 | 10/1990 | Chao | 95/902 X |
| 5,026,406 | 6/1991 | Kumar | 55/26 |
| 5,045,515 | 9/1991 | Chao et al. | 502/67 |
| 5,232,473 | 8/1993 | Kapoor et al. | 55/26 |
| 5,453,113 | 9/1995 | Zarchy et al. | 95/105 X |
| 5,587,003 | 12/1996 | Bülow et al. | 95/123 |

FOREIGN PATENT DOCUMENTS

| | | | |
|---|---|---|---|
| 0552102 | 4/1977 | U.S.S.R. | 95/139 |
| 0679228 | 8/1979 | U.S.S.R. | 95/139 |

OTHER PUBLICATIONS

Breck, "Zeolite Molecular Sieves", John Wiley & Sons, 1974, pp. 128–129, 138–139, 458–459, 596–597, 642–655, 664–671, 690–691, 698–719.

Frankiewicz et al., "Methane/Nitrogen Gas Separation over the Zeolite Clinoptilolite by the Selective Adsorption of Nitrogen" Industrial Gas Separations, ACS Symposium Series, 1983, pp. 213–233.

Humphrey et al., "Separation Process Technology," McGraw Hill, 1997, pp. 153–223.

Keller, "Gas Adsorption Processes, State of the Art," Industrial Gas Separations, ACS Symposium Series, 1983, pp. 145–169.

Kohl, "Gas Dehydration and Purification by Adsorption," *Gas Purification*, Gulf Publishing Co., 1985, pp. 630–635, 654–657, 668–685.

Ruthvan, "Synopsis of PSA Patent Literature," in *Pressure Swing Adsorption*, VCH Publishers, 1994, pp. 327–343.

Sircar, "Separation of Methane and Carbon Dioxide Gas Mixtures by Pressure Swing Adsorption," *Separation Science and Technology*, vol. 23, Nos. 6 & 7, 1988, pp. 519–529.

Vyas et al., "Bulk Separation and Purification of $CH_4/CO_2$ Mixtures on 4A/13X Molecular Sieves by Using Pressure Swing Adsorption," *Separation Science and Technology*, vol. 26, Nos. 10 & 11, 1991, pp. 1419–1431.

Yang, "Gas Separation by Adsorption Processes," Butterworth Publishers, 1987, pp. 1–7, 201–2132.

*Primary Examiner*—Robert Spitzer
*Attorney, Agent, or Firm*—Sheridan Ross P.C.

[57] ABSTRACT

Bulk separation of carbon dioxide from methane is accomplished using a modified pressure swing adsorption system where the adsorbent used is a naturally occurring sodium-rich clinoptilolite. Most of the carbon dioxide can be removed at low operating pressures, and the principal agent of regeneration is a high volume air rinse rather than pressure reduction.

26 Claims, 8 Drawing Sheets

BULK SEPARATION OF CARBON DIOXIDE FROM METHANE USING NATURAL CLINOPTILOLITE

CROSS-REFERENCE TO RELATED APPLICATIONS

The present application claims priority from U.S. provisional application Serial No. 60/050,683, filed Jun. 25, 1997.

FIELD OF THE INVENTION

This invention is directed to a method for achieving the bulk separation and nearly complete removal of carbon dioxide from methane using a modified PSA (pressure swing adsorption) system. The invention can be employed to remove $CO_2$ from landfill gas, coalbed methane and coal mine gob gas, sewage gas or low quality natural gas. The invention can also be used for the separation of carbon dioxide from other gases, such as other hydrocarbons, hydrogen and air, which are less strongly adsorbed than carbon dioxide on the adsorbent described herein.

BACKGROUND OF THE INVENTION

A number of approaches have been used for the bulk separation of carbon dioxide from methane. Conventional technology in the natural gas industry uses amine, a liquid absorbent, to remove $CO_2$, but these plants are generally suitable only for very large volumes of gas, and will not work in the presence of oxygen, such as typically found in landfill gas and coal mine gob gas. Another liquid absorbent, a glycol derivative with the trade name Selexol has been successfully used with landfill gas, but it requires pressurization up to 300 psi and is fairly expensive.

For smaller volume applications where gas flows are less than five or ten million cubic feet per day, considerable attention has been given to the development of pressure swing adsorption (PSA) processes. This technology is based on the tendency of solids to attract or bind gaseous molecules to their surface, and for some solids to attract certain gases more strongly than other gases. Typically, the higher the pressure of the gas, the more is adsorbed on the surface of the solid. A curve representing this relationship at a constant temperature (temperature also has an effect on the amount of gas adsorbed) is called an isotherm. Though adsorption is not well understood, it is thought that the adsorbed gas forms a partial or complete layer only one or at most a few molecules thick on the surface of the solid. This layer can be thought of as being a liquid state of the gas. Sometimes a gas is not desorbed as readily as it is adsorbed, so that the desorption isotherm will show hysteresis in comparison to the adsorption isotherm. Gas separations using pressure swing adsorption processes are based on the selective adsorption on the solid, or adsorbent, of some gases over others as pressures are increased, thereby concentrating the gas that is less strongly adsorbed. When the pressure is decreased the adsorbed gas is desorbed, thereby regenerating the solid for successive cycles of adsorption and desorption. Solids used in PSA processes are typically those that have very large surface areas, such as activated carbon, silica gel, or molecular sieves (zeolites), which have the added advantage of being able to screen out gases having molecular diameters larger than the pores in the zeolite.

Numerous patents describe PSA processes for separating carbon dioxide from methane or other gases. They have in common the use of one of the adsorbents described above that adsorb carbon dioxide preferentially over methane. A typical design has two or more adsorbent columns that go through a series of cycles involving pressurization, flow of a primary product gas containing predominantly methane, depressurization and regeneration with a secondary product containing predominantly carbon dioxide. There are many variations in handling the depressurization or blowdown gas in efforts to conserve the energy of pressurization and minimize methane losses. Also, there are many approaches to purging and re-pressurizing the columns using primary and secondary product gases. Concurrent or counter current flows are used in an effort to increase the purity of the product(s). Many PSA processes may require high operating pressures, are not successful in achieving a good separation, or use expensive adsorbents. The lack of an economical process for removing carbon dioxide from landfill gas is believed to be the main reason very few landfill operations attempt to make a high BTU fuel.

One of the earlier patents in this area is U.S. Pat. No. 3,751,878, which describes a PSA system using a zeolite molecular sieve that selectively adsorbs $CO_2$ from a low quality natural gas stream operating at a pressure of 1000 psia, and a temperature of 300° F. The system uses carbon dioxide as a purge to remove some adsorbed methane from the zeolite and to purge methane from the void space in the column. U.S. Pat. No. 4,077,779, describes the use of a carbon molecular sieve that adsorbs $CO_2$ selectively over hydrogen or methane. After the adsorption step, a high pressure purge with $CO_2$ is followed by pressure reduction and desorption of $CO_2$ followed by a rinse at an intermediate pressure with an extraneous gas such as air. The column is then subjected to vacuum to remove the extraneous gas and any remaining $CO_2$.

U.S. Pat. No. 4,770,676, describes a process combining a temperature swing adsorption (TSA) process with a PSA process for the recovery of methane from landfill gas. The TSA process removes water and minor impurities from the gas, which then goes to the PSA system, which is similar to that described in U.S. Pat. No. 4,077,779 above, except the external rinse step has been eliminated. $CO_2$ from the PSA section is heated and used to regenerate the TSA section. U.S. Pat. No. 4,857,083, claims an improvement over U.S. Pat. No. 4,077,779 by eliminating the external rinse step and using an internal rinse of secondary product gas ($CO_2$) during blowdown, and adding a vacuum for regeneration. The preferred type of adsorbent is activated carbon, but can be a zeolite such as 5A, molecular sieve carbons, silica gel, activated alumina or other adsorbents selective of carbon dioxide and gaseous hydrocarbons other than methane.

U.S. Pat. No. 4,915,711, describes a PSA process that uses adsorbents from essentially the same list as above, and produces two high purity products by flushing the product (methane) from the column with the secondary product (carbon dioxide) at low pressure, and regenerating the adsorbent using a vacuum of approximately 1 to 4 psia. The process includes an optional step of pressure equalization between columns during blowdown. U.S. Pat. No. 5,026,406 is a continuation in part of U.S. Pat. No. 4,915,711 with minor modifications of the process.

Use of the zeolite clinoptilolite has been described in three relevant patents. U.S. Pat. No. 4,935,580, describes a process for removing trace amounts of water or $CO_2$ from a hydrocarbon gas stream using an ion-exchanged clinoptilolite. U.S. Pat. No. 5,587,003, describes using natural or synthetic clinoptilolite as an adsorbent to remove carbon dioxide at very low partial pressures, i.e. in trace amounts, from a gas stream, particularly air. U.S. Pat. No. 4,964,889, describes a process for using a clinoptilolite that has been ion-exchanged to have a high proportion of magnesium ions to separate nitrogen from methane in a PSA process. Included in the description is the necessity to remove water from the clinoptilolite by activation at temperatures of 350° to 700° C.

SUMMARY OF THE INVENTION

The present invention is a variation of a pressure swing adsorption system for separating carbon dioxide from methane or other gases. A feed gas, a mixture of methane (or other gases) and carbon dioxide, is passed through the adsorbent bed. The carbon dioxide is adsorbed and the methane (or other gas) passes through as a nearly pure product. The adsorbent used in the present invention has such a strong attraction for carbon dioxide that little significant desorption occurs even down to pressures of one or two psia. Put another way, there is extreme hysteresis between the adsorption and desorption isotherms. Therefore the regeneration of the adsorbent bed is not based on reducing the pressure, but rather on a process analogous to leaching of a solid using a liquid media. Or more accurately, if the adsorbed carbon dioxide can be considered to be in a liquid state, it is "evaporated" by exposure to a stream of dry air. Regeneration of the bed is accomplished by forcing large volumes of air through the bed at near atmospheric pressure, in effect "leaching" the carbon dioxide out of the adsorbent. This differs from U.S. Pat. No. 4,077,779 described above, which contains a rinse step using air, but where the primary instrument of regeneration remains pressure reduction. In the present instance the air rinse is the primary instrument of regeneration of the zeolite, rather than pressure reduction as in other systems. This can be illustrated by the graph of FIG. 6, which compares the average $CO_2$ content of blowdown gas to the $CO_2$ content of the feed gas. The blowdown gas is that gas coming out of a column when it is reduced from operating pressure to atmospheric pressure after the column has reached its adsorptive capacity for $CO_2$. It can be seen that the blowdown gas consistently has less $CO_2$ content than the feed gas, indicating that no significant desorption of $CO_2$ is taking place during depressurization.

The general form of the invention is typical for PSA systems and consists of two or more adsorption columns, with one column being on line while the other column or columns are blowing down or in regeneration. The system includes a feed gas compressor or blower, depending on the operating pressure chosen, an air blower and air dryer. An optional vacuum pump may be included to remove methane-rich void gas from the columns after blowdown, or air from the columns after the air regeneration step. Blowdown gas is recycled to the feed, or alternatively can be used to partially pressurize the next column in line. A feed gas dryer is required if the gas has not already been dried prior to delivery to the system and other pretreatment may be necessary if there are minor constituents in the feed, such as with landfill gas. Oxygen or nitrogen, if present, will remain with the methane in the product gas.

The disadvantage of not being able to regenerate the adsorbent through simple pressure swing is more than outweighed by the fact that a very efficient bulk separation of carbon dioxide from gas mixtures containing 50% or more carbon dioxide can be accomplished at pressures only high enough above atmospheric to drive the process. This will achieve in one step a product containing less than about 10% $CO_2$, more preferably less than about 5% $CO_2$ and most preferably less than about 1% carbon dioxide. If a higher purity is desired, increasing the operating pressure of the system to an appropriate level (e.g. 165) psia will reduce the carbon dioxide content to less than about 0.1%. This can also be done in one step, but if the original feed gas is high in $CO_2$ content, this higher purification is preferably done with a second stage of adsorption to save on compression costs.

An illustration of the effect of operating pressure on product purity is illustrated by the graph of FIG. 7, which is based on experimental data from dynamic bench scale testing. That is, the graph in FIG. 7 illustrates the decline in $CO_2$ content in the output product gas as partial pressure varies. It should be noted that this relationship is substantially independent of $CO_2$ content in the feed gas.

The graph of FIG. 8 graphically illustrates the adsorption capacity of the adsorbent as related to the partial pressure of the carbon dioxide in the feed mixture, and is based on experimental data. On the vertical axis, the graph of FIG. 8 shows the standard cubic feet (SCF) of carbon dioxide adsorbed per pound of adsorbent versus the partial pressure of carbon dioxide in the feed gas.

That is, FIG. 8 shows a graph that indicates the standard cubic feet of $CO_2$ in a $CO_2$-methane mixture (per pound of adsorbent) that can be fed into a column before "breakthrough," that is, before the $CO_2$ content in the product gas starts to increase above a predetermined threshold. The graph of FIG. 8 can be used to build a process model to calculate the appropriate size of column needed to process a given stream of gas.

An important part of this invention is the type of adsorbent used, which is a variety of the natural zeolite, clinoptilolite. This is a sodium rich clinoptilolite with the approximate chemical formula $Na_6[Al_6Si_{30}O_{72}] \cdot 24H_2O$. Minor amounts of the sodium may be replaced by calcium, potassium or magnesium in the natural state. The zeolite is mined from a deposit, crushed and screened to a particle size of more or less 6 by 30 mesh. It is then activated by heating to approximately 350° C., after which it has a bulk density of about 0.9 gm/cc or 56 lb./cubic foot. Other clinoptilolites, or the same clinoptilolite activated at different temperatures, may be used in the invention but can be expected to give somewhat different results. Heating to temperatures over 400° C. starts to affect the crystalline structure of the mineral. A significant advantage of this invention is the use of a natural zeolite with minimal preparation for use, compared to other PSA systems that use expensive synthetic adsorbents, or that may start with natural zeolites that are subsequently ion-exchanged and/or pelletized before use.

DETAILED DESCRIPTION OF THE INVENTION

Figure 1:
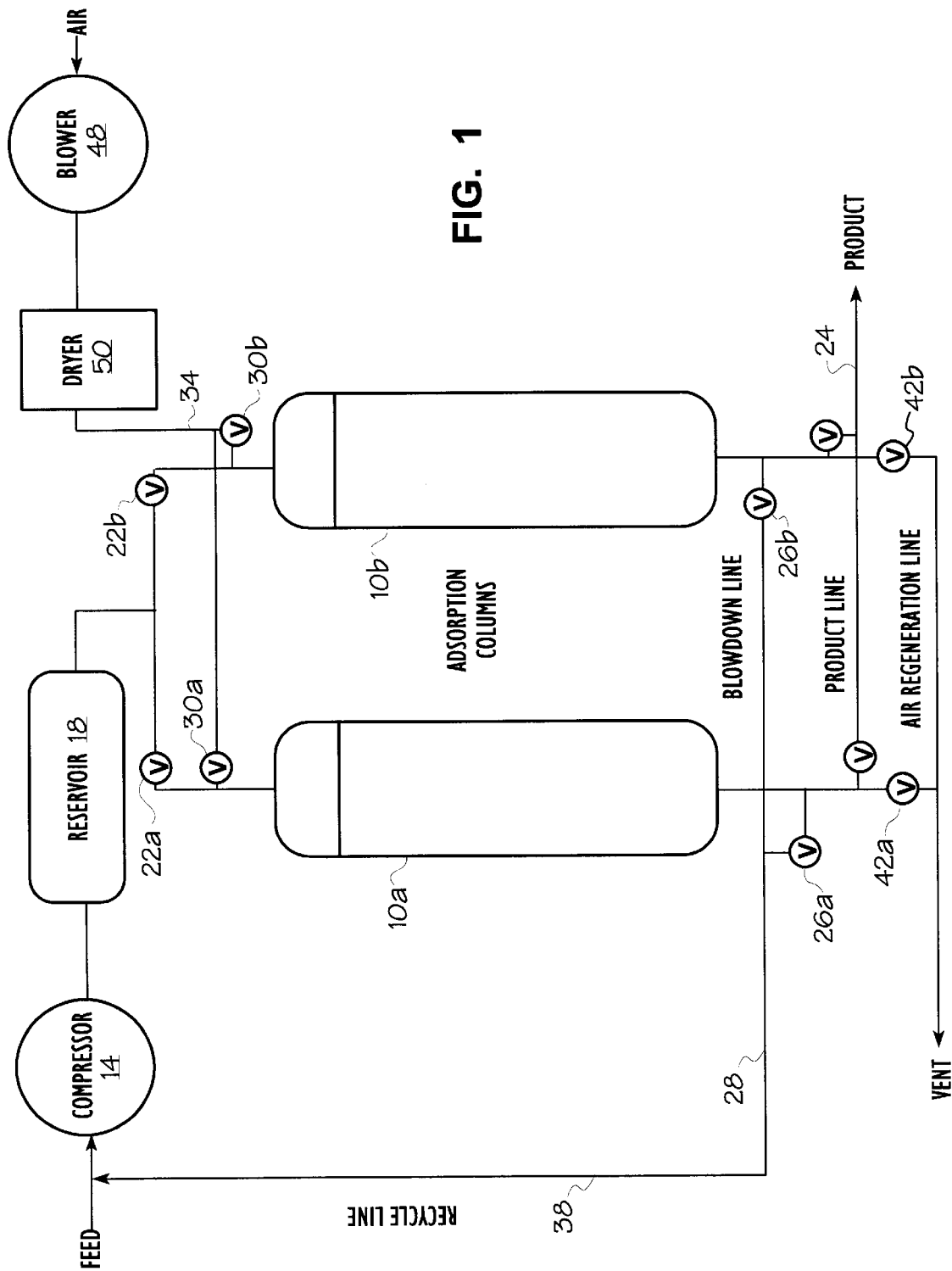
FIG. 1 is a diagram of the simplest form of the invention, using two adsorption columns.

The simplest embodiment of the invention is shown in FIG. 1 and alternative embodiments are shown in subsequent figures. In the discussion that follows, components of the figures will be discussed. For each component of FIG. 1 that has one or more additional analogous components in one of the other FIGS. 2–5, the labels for analogous such components will be provided in parentheses immediately following the corresponding component(s) of FIG. 1 being discussed. Accordingly, each of the columns 10a and 10b (10c and 10d) is filled with activated clinoptilolite. Feed gas in a mixture of 1% to 75% carbon dioxide, and the balance methane, is compressed to a pressure of about 1 to about 200 psig, depending on the purity of product desired. The compression of the feed gas is provided by the compressor 14 in combination with the feed gas reservoir 18 which is used to retain a sufficient volume of feed gas under pressure so that the adsorption columns 10a and 10b (10c and 10d) can be readily filled with the feed gas when one of the valves 22a and 22b (22c and 22d) is opened. Normally, feed gas mixtures that contain a high percentage of carbon dioxide will be processed at lower pressures to avoid compressing large amounts of carbon dioxide. If a high purity product is desired, the product gas output from a low pressure operation of the present invention (the product gas containing less than 1% carbon dioxide), can subsequently be brought to a higher pressure for a second stage of adsorption and purification by the present invention.

The present invention has a basic cycle of five stages for each of columns 10a and 10b (10c and 10d). Accordingly, to reflect the fact that the description of each stage is applicable to any one of the columns 10a through 10d, a generic label of "x" (and in some cases, "y") will be used to indicate a, b, c or d. Thus, in the notations 10x, 22x, 26x, 30x, "x" can be interpreted as a variable having a value of one of a, b, c or d.

1. Compression and Product Flow. The cycle begins with opening the feed valve 22x to Column 10x, allowing the feed gas to pressurize the column until the desired operating pressure is reached, then the product gas, containing mostly methane, will flow from the product line 24. After a period of time when the adsorbent bed has reached its capacity, the product gas will show a gradual increase in carbon dioxide. At that time, or just before that time, the feed gas valve 22x to Column 10x is shut off and the feed gas valve 22x to Column 10x is opened.

2. Blowdown. The valve 26x to the blowdown line 28 is opened and Column 10x is allowed to blow down to atmospheric pressure, with the blowdown gas being directed to the intake side of the feed compressor 14, where it is mixed with the feed gas and recycled back to the feed reservoir 18.

3. Feed Gas Purge. The valve 30x from the regeneration air line 34 is partially opened, or alternatively a restricted flow bypass line is opened to achieve a slow flow of air into the Column 10x to purge the column of methane-rich gas remaining in the void spaces. This purged gas mixture is also recycled to the inlet side of the feed compressor 14. Before any of the air reaches the recycle line 38, the blowdown, or recycle valve 26x is closed, and the valve 42x to the vent line 46 is opened.

4. Air Regeneration. At the next stage of the process the regeneration air valve is fully opened. Atmospheric air is blown (via blower 48) through a drier 50 and through the Column 10x at low pressure and high volume. Initial flow composition from the column will contain about 15 to 20 percent carbon dioxide and about 1% to 15% methane, and more preferably less than about 5% methane, as a small amount of methane is adsorbed with the carbon dioxide. This methane content will quickly drop to essentially zero. From 50 to 150 column 10x volumes of air may be required to remove enough of the adsorbed carbon dioxide from the bed sufficient to retain consistent adsorption capacity in subsequent cycles. This can be judged by the point at which the effluent air from the column levels off at less than 1 percent $CO_2$. It should be noted that this regeneration step only removes about half the $CO_2$ adsorbed during the first adsorption cycle of a new bed. Or to put it another way, the adsorption capacity of the bed in subsequent cycles is only about half that of the first cycle.

5. Air Purge. After the column 10x has been regenerated, the feed valve 22x is partially opened to purge the air out of the column using feed gas. When the column is free of air, the vent valve 42x is closed and the column 10x is then ready for the next cycle of repressurization and product flow.

Columns 10x are sized according to the rate and composition of the feed flow so that one column can complete blowdown, air regeneration and purge steps while the other column is on line, so there is no interruption of feed flow. For mixtures such as landfill gas containing a high percentage of carbon dioxide, the on-line time for a reasonably sized column will be relatively short, so it may be necessary to have three or more of the columns 10a through 10d in a system in order to allow enough time for each column to get through the necessary stages in the cycle while other columns are on line. A typical 15 minute cycle for a three column system is diagrammed below, starting with column 10a just having finished its on-line stage:

| Time, minutes | Column 10a | Column 10b | Column 10c |
|---|---|---|---|
| 1 | Blowdown | Compression/On Line | Air Regeneration |
| 2 | Feed Gas Purge | On Line | Air Regeneration |
| 3 | Air Regeneration | On Line | Air Regeneration |
| 4 | Air Regeneration | On Line | Air Regeneration |
| 5 | Air Regeneration | On Line | Air Purge |
| 6 | Air Regeneration | Blowdown | Compression/On Line |
| 7 | Air Regeneration | Feed Gas Purge | On Line |
| 8 | Air Regeneration | Air Regeneration | On Line |
| 9 | Air Regeneration | Air Regeneration | On Line |
| 10 | Air Purge | Air Regeneration | On Line |
| 11 | Compression/On Line | Air Regeneration | Blowdown |
| 12 | On Line | Air Regeneration | Feed Gas Purge |
| 13 | On Line | Air Regeneration | Air Regeneration |
| 14 | On Line | Air Regeneration | Air Regeneration |
| 15 | On Line | Air Purge | Air Regeneration |
| 16 | Blowdown | Compression/On Line | Air Regeneration |

Figure 2:
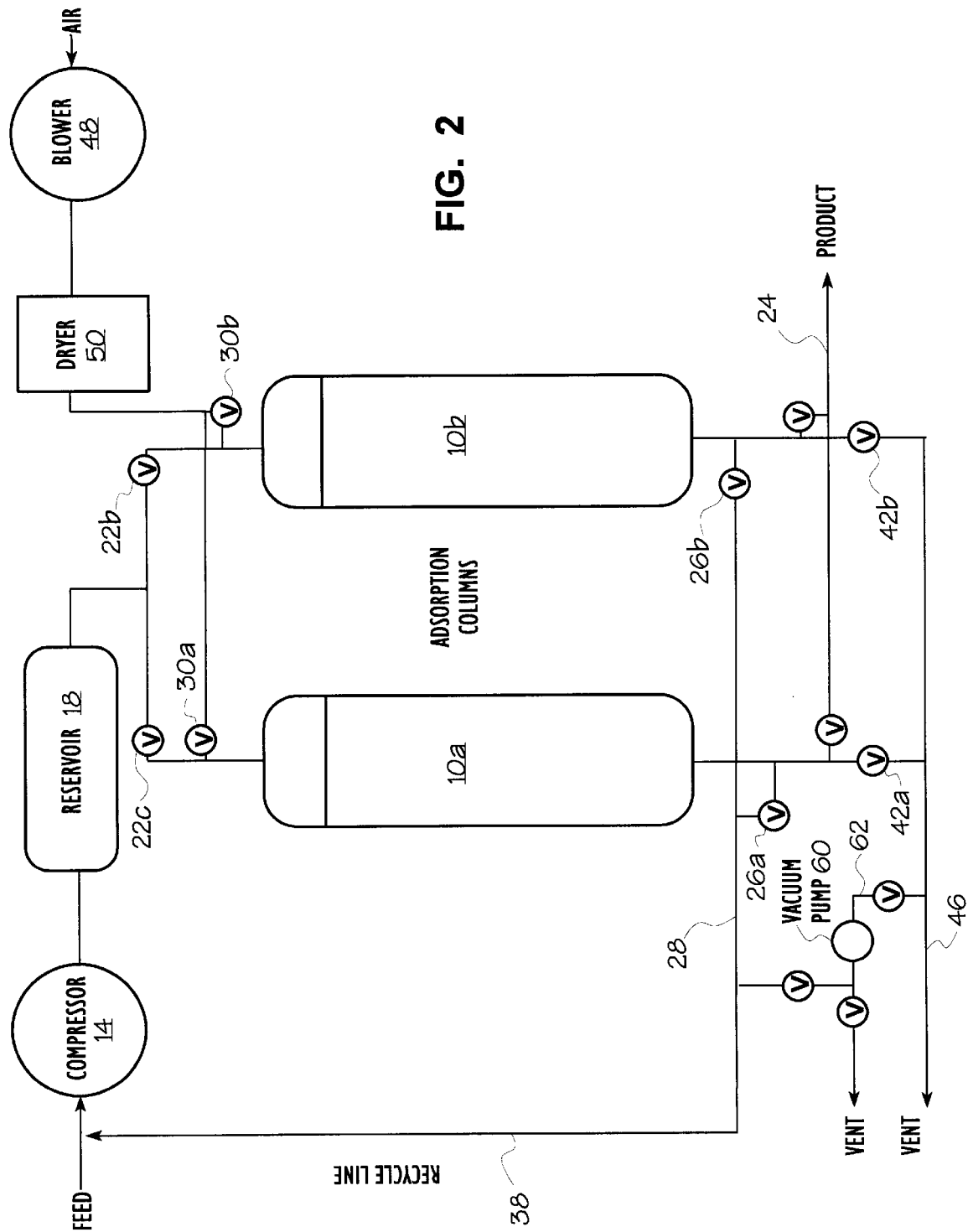
FIG. 2 is an optional modification that includes a vacuum cycle.

Optionally, a vacuum pump 60 and vacuum line 62 may be used to evacuate the column of feed gas or air, replacing the "Feed Gas Purge" and "Air Purge" steps of the cycle described above. The schematic for this option is illustrated in FIG. 2. Application of a vacuum step in place of the feed gas purge has a minor beneficial effect on overall methane recovery as the small amount of methane adsorbed along with the carbon dioxide during the pressurized phase may be recovered and recycled. Application of a vacuum at this stage has little if any utility in regenerating the adsorbent bed. Also, by removing most of the methane rich mixture left in the void spaces of a column 10x, the possibility of obtaining explosive mixtures is minimized when air is introduced into the column at the next step. Likewise, application of a vacuum after the air regeneration step minimizes the potential for obtaining explosive mixtures when feed gas is introduced to repressurize the column. If the vacuum cycle is not utilized, an explosive mixture may be present during certain phases of the cycle, and care must be taken in the design of the present invention to ensure that no source of ignition, including static discharge, can contact the gas mixtures residing in, e.g., a column 10*x*.

Figure 3:
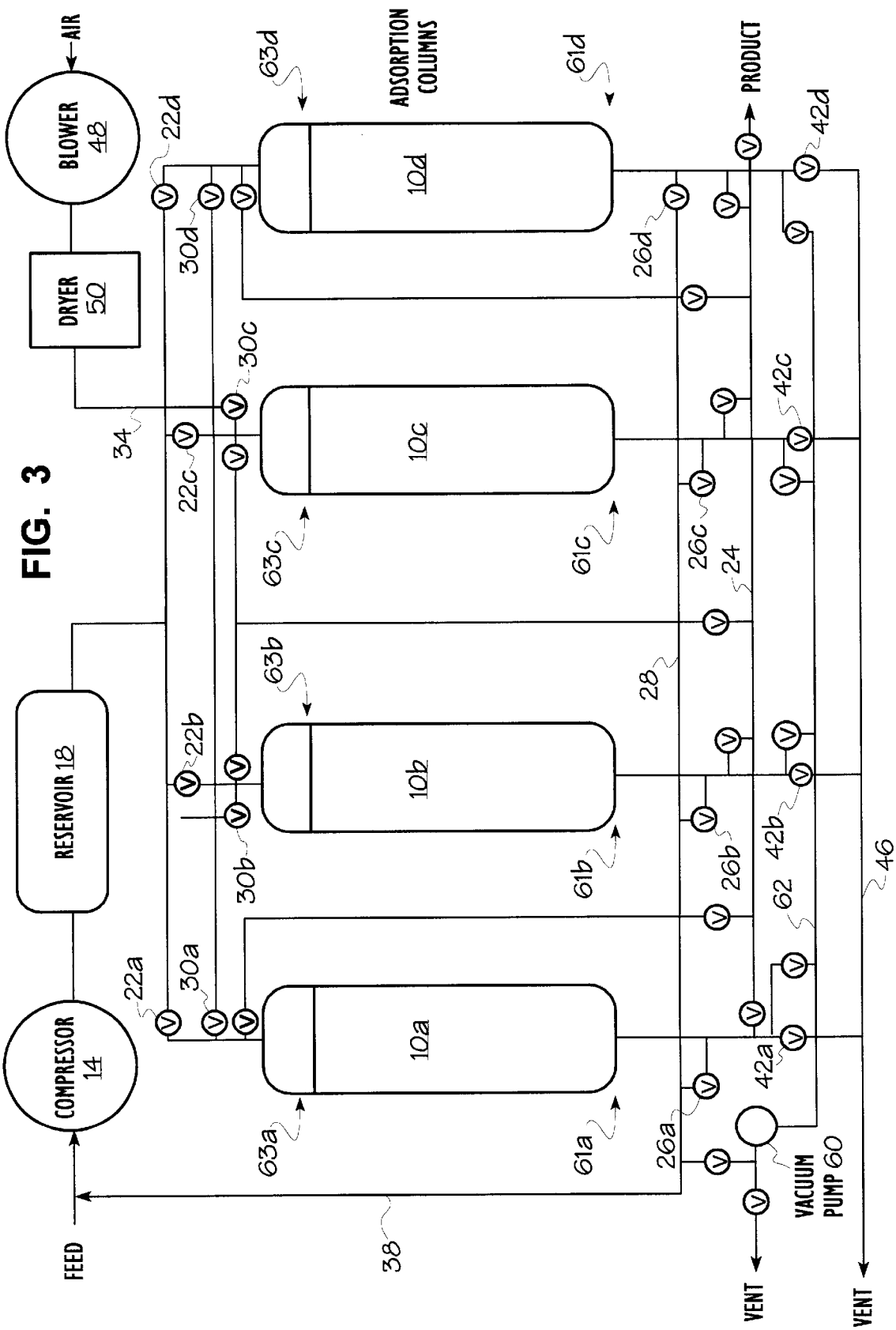
FIGS. 3, 4 and 5 are alternative forms using four adsorption columns and designed to increase the product purity, save compression energy or both.

A third embodiment of the invention uses four adsorption columns 10*a* through 10*d* as pictured in FIG. 3. The purpose of this embodiment is to increase the average purity of the product gas. When a column 10*x* reaches its desired operating pressure and product gas starts to flow, the initial flow from each of the product ends 61*a* through 61*d* of the columns 10*a* through 10*d*, respectively, to the product line 24 may be contaminated with carbon dioxide that has not been adsorbed. This condition may be enough to raise the average $CO_2$ content in the product by one or two tenths of one percent. In order to avoid this contamination, the initial flow can be directed to one of the feed ends 63*a* through 63*d* of the next column 10*a* through 10*d* in line that has already completed its regeneration and vacuum stages and is on standby. When the $CO_2$ content has dropped to the level expected for the operating pressure chosen, the flow is redirected to the output of the product line 24. Other stages will follow as described above for the embodiments of the present invention having two columns (10*a*, 10*b*) or three columns (10*a*, 10*b* and 10*c*) may also be described that are similar to the four column sequencing as illustrated in the table below.

| Time, minutes | Column 10a | Column 10b | Column 10c | Column 10d |
|---|---|---|---|---|
| 1 | Blowdown | Comp./Flow to C | Standby | Air Regeneration |
| 2 | Vacuum | On Line | Standby | Air Regeneration |
| 3 | Air Regeneration | On Line | Standby | Air Regeneration |
| 4 | Air Regeneration | On Line | Standby | Air Regeneration |
| 5 | Air Regeneration | On Line | Standby | Vacuum |
| 6 | Air Regeneration | Blowdown | Comp. Flow to D | Standby |
| 7 | Air Regeneration | Vacuum | On Line | Standby |
| 8 | Air Regeneration | Air Regeneration | On Line | Standby |
| 9 | Air Regeneration | Air Regeneration | On Line | Standby |
| 10 | Vacuum | Air Regeneration | On Line | Standby |
| 11 | Standby | Air Regeneration | Blowdown | Comp. Flow to A |
| 12 | Standby | Air Regeneration | Vacuum | On Line |
| 13 | Standby | Air Regeneration | Air Regeneration | On Line |
| 14 | Standby | Air Regeneration | Air Regeneration | On Line |
| 15 | Standby | Vacuum | Air Regeneration | On Line |
| 16 | Comp. Flow to B | Standby | Air Regeneration | Blowdown |
| 17 | On Line | Standby | Air Regeneration | Vacuum |
| 18 | On Line | Standby | Air Regeneration | Air Regeneration |
| 19 | On Line | Standby | Air Regeneration | Air Regeneration |
| 20 | On Line | Standby | Vacuum | Air Regeneration |
| 21 | Blowdown | Comp. Flow to C | Standby | Air Regeneration |

Figure 4:
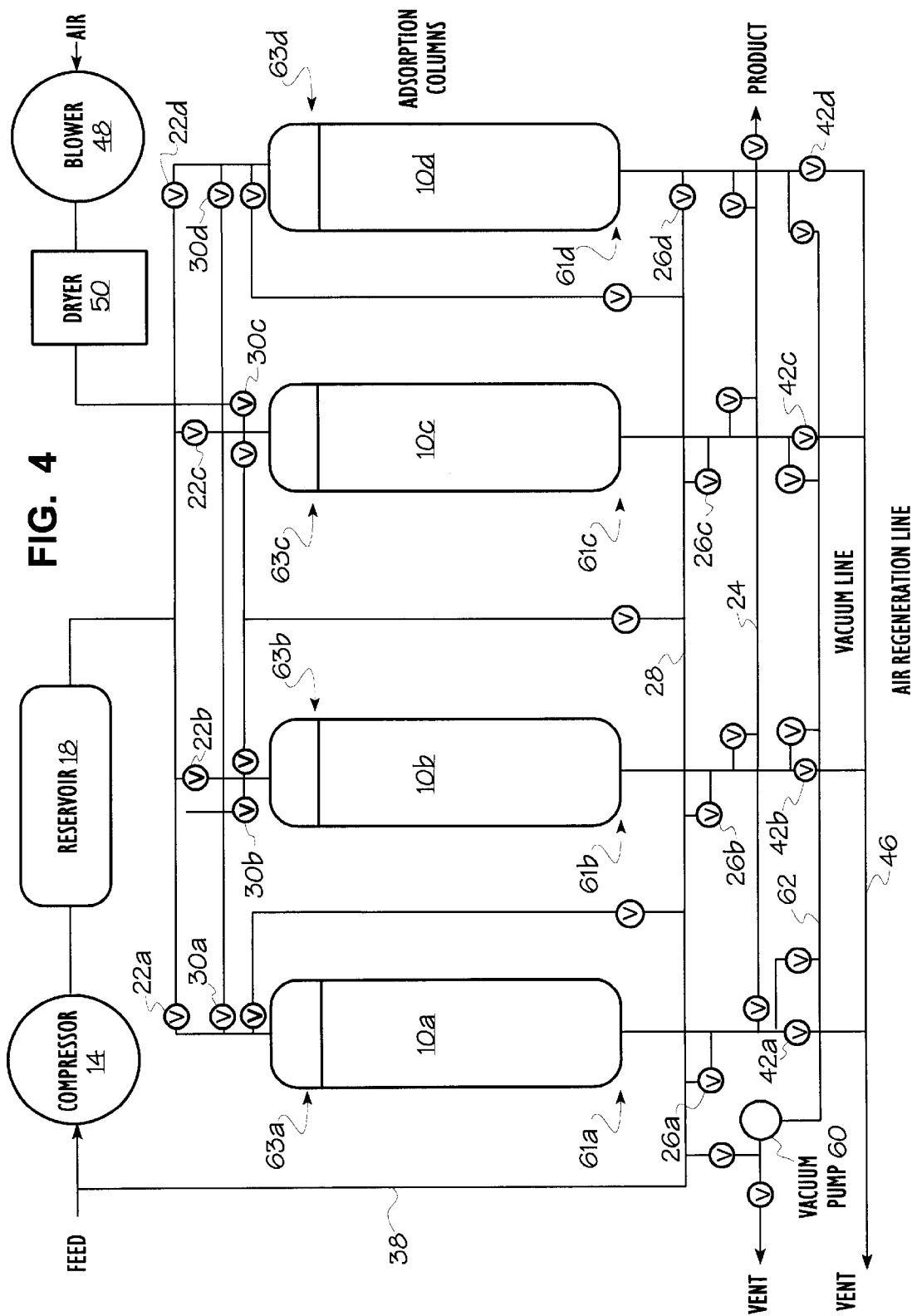

A fourth embodiment of the invention also uses four columns, as pictured in FIG. 4. The purpose of this embodiment is to conserve compression energy by using blowdown gas to partially pressurize the next column 10*x* in line, which will then be on standby as above. In this instance, the blowdown from one column is directed to the feed end 63*x* of the standby column 10*x* until the pressures in the two columns are equalized, then the remaining blowdown to atmospheric pressure is directed to the recycle line 38 as before. Obviously, this embodiment would probably not be used if the present invention were using a low operating pressure.

Figure 5:
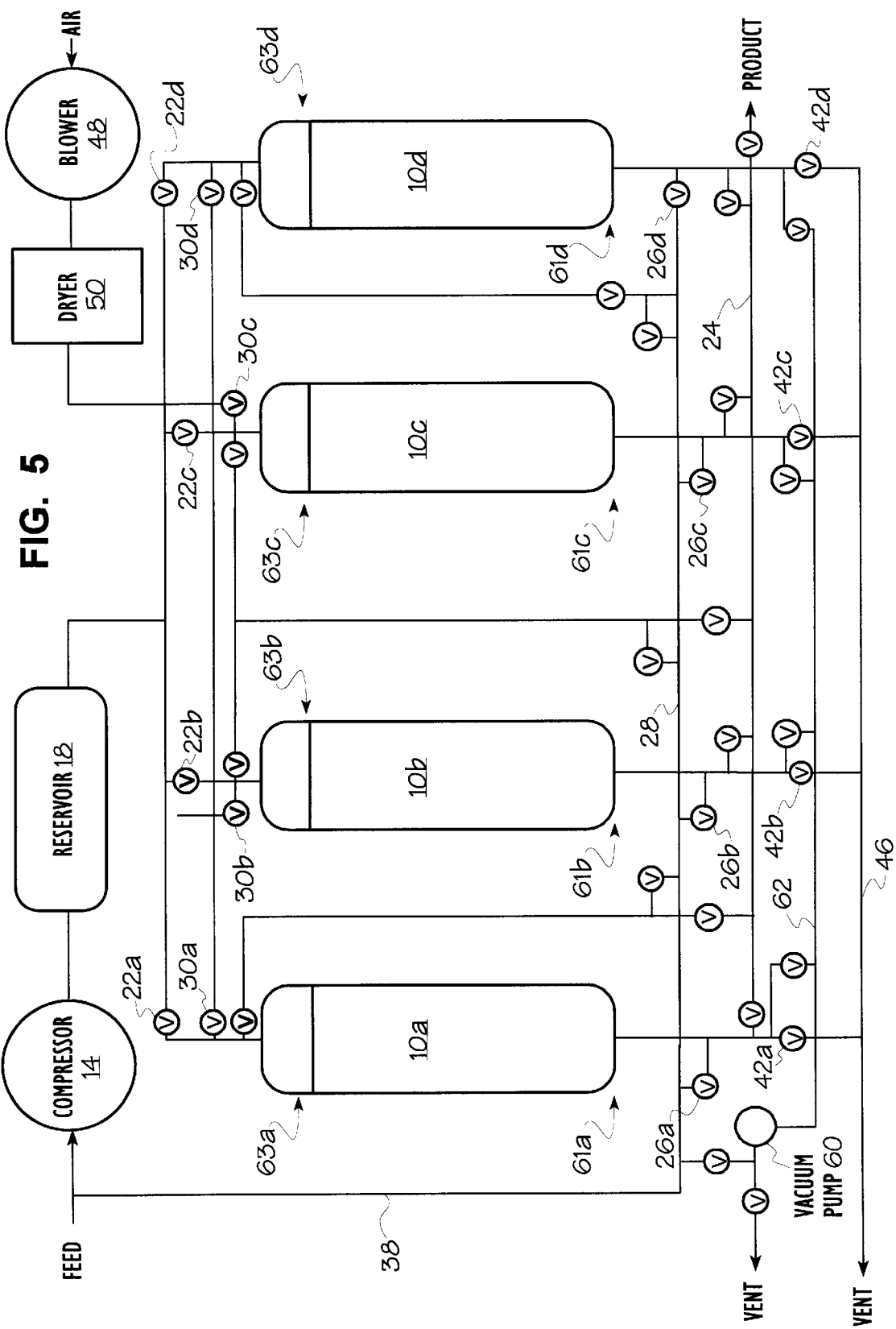
Figure 6:
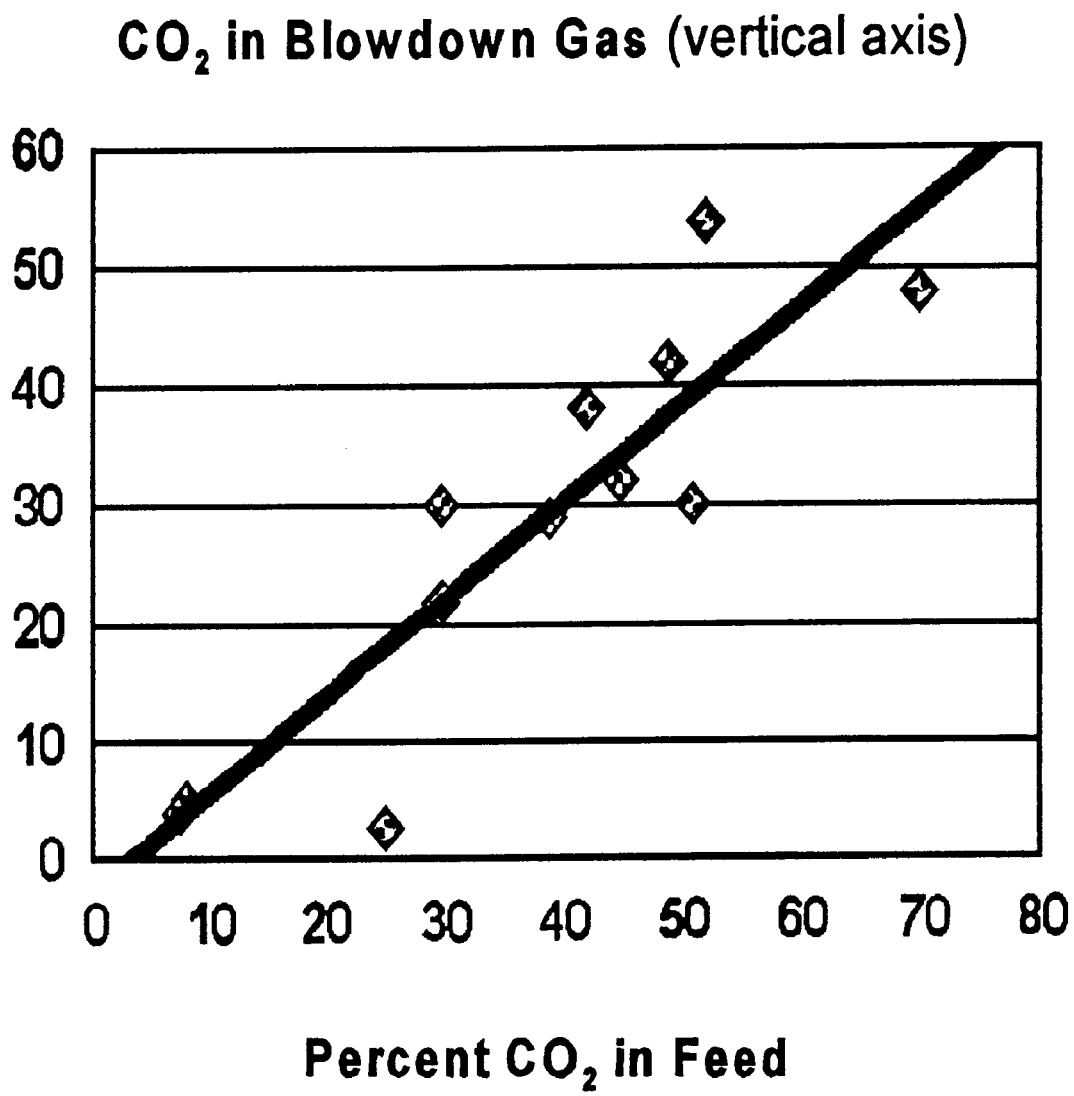
FIG. 6 is a graph that compares the average $CO_2$ content of the blowdown gas to the $CO_2$ content of the feed gas during operation of the present invention.
Figure 7:
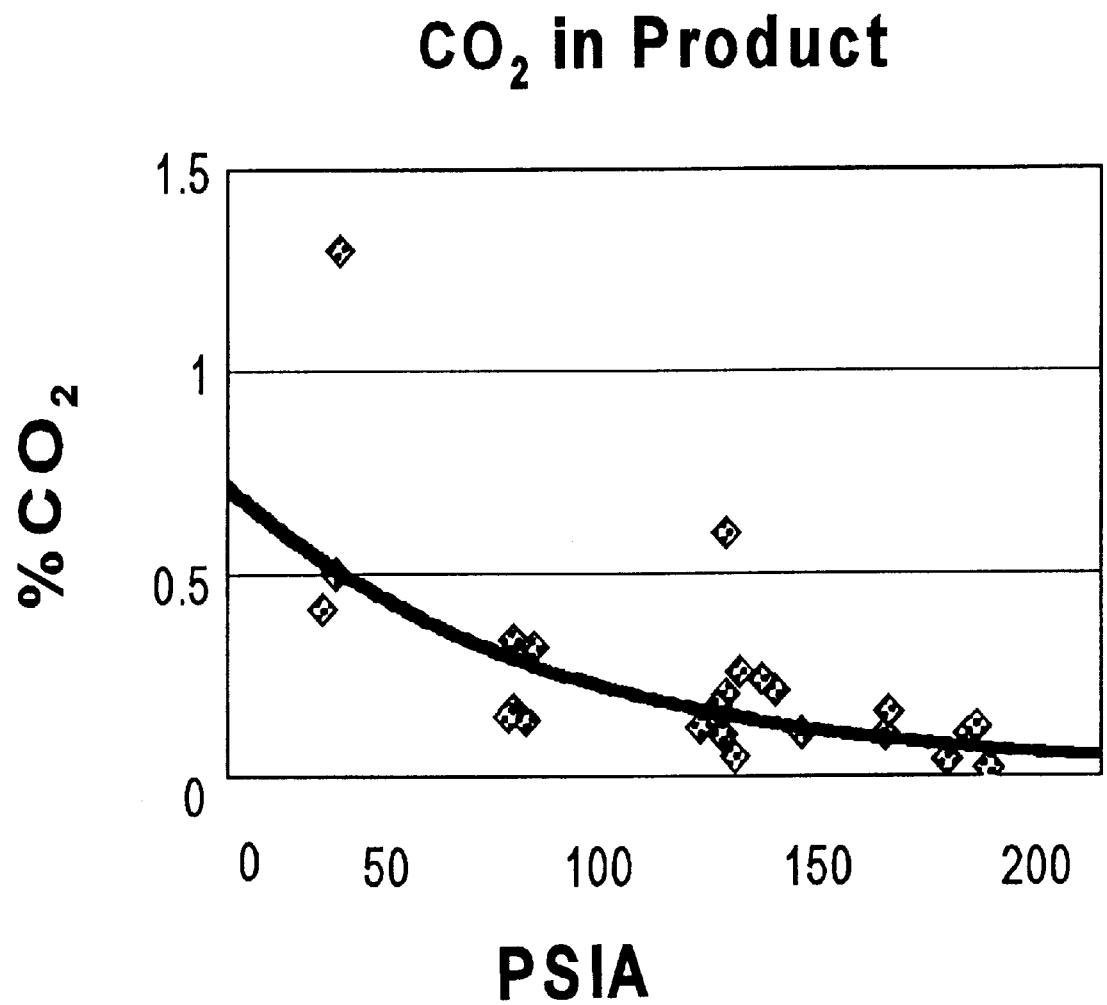
FIG. 7 is a graph that illustrates the decline in the percentage of $CO_2$ content in the output product gas as the partial pressure (PSIA) varies during operation of the present invention.
Figure 8:
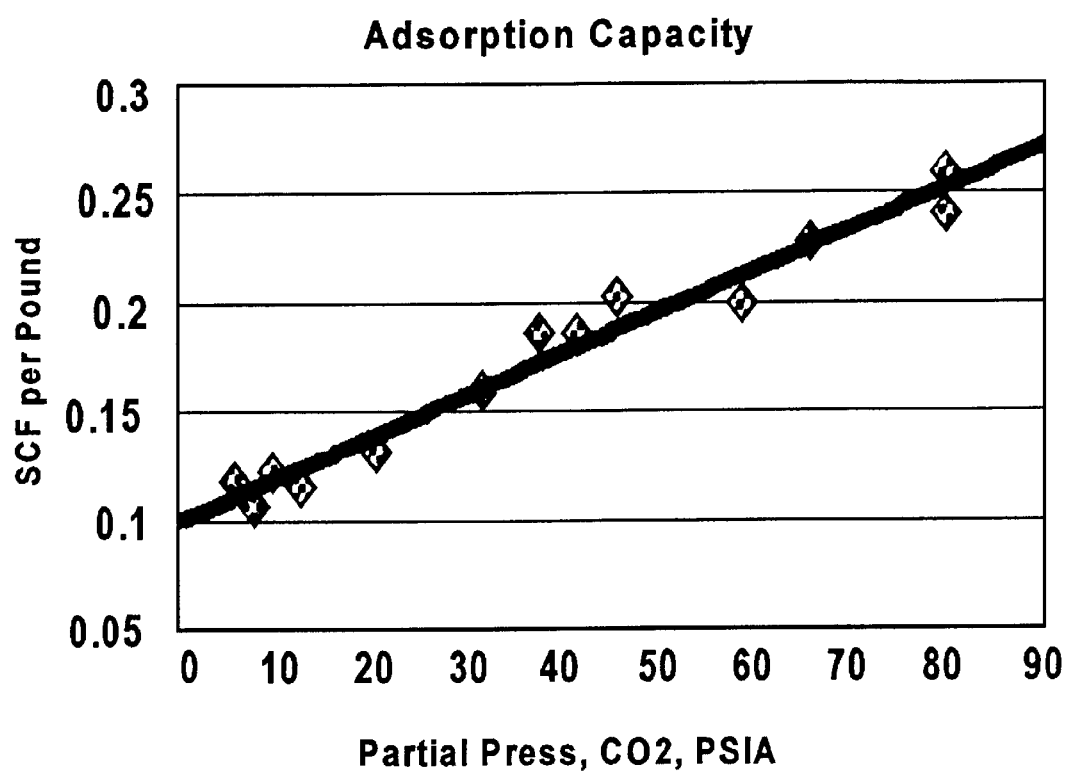
FIG. 8 shows a graph of the standard cubic feet (SCF) of carbon dioxide absorbed per pound of adsorbent versus the partial pressure of carbon dioxide in the feed gas during operation of the present invention.

Yet a fifth embodiment of the invention combines the features of the third and fourth embodiments, as depicted in FIG. 5. This allows for initial blowdown flow from any column 10*x* to go to another column 10*y* on standby until the pressures are equalized. Thus, initial contaminated product flows to a column 10*y* from another column 10*x*, which will be at a pressure higher than the equalized pressure. Subsequently, feed gas will be directed to the same standby column 10*y* that has already been partially pressurized by the blowdown flow. Note that when the feed gas is subsequently directed to this column 10*y*, the column will already have reached approximately half or better of its operating pressure.

All embodiments of the invention utilize concurrent flow from the feed end 63 to the product end 61 of the columns 10*a* through 10*d* for all parts of the cycle. The purpose of this is to avoid unnecessary flexing of the adsorbent bed and possible consequent attrition of the adsorbent particles that can occur with flows that are continually changing directions.

The foregoing discussion of the invention has been presented for purposes of illustration and description. Further, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention as such, or in other embodiments, and with the various modifications required by the particular application or uses of the invention. It is intended that the appended claims be construed to include alternative embodiments to the extent permitted by the prior art.

What is claimed is:

1. A method for bulk separation of carbon dioxide from methane, comprising:

providing a feed gas comprising a mixture of methane and carbon dioxide;

performing a step of passing said feed gas through an absorbent bed that includes an absorbent that comprises an effective amount of clinoptilolite to absorb carbon dioxide in said feed gas; and performing a step of exposing said absorbent bed to a stream of dry air for removing carbon dioxide from said absorbent bed, wherein said stream removes a majority of the carbon dioxide that is removed from said absorbent bed.

2. The method as set forth in claim 1, wherein said absorbent bed experiences insignificant desorption at pressures in a range of approximately 15 psia to approximately 2 psia.

3. The method as set forth in claim 1, wherein said method does not employ pressure reduction devices for reducing pressure on said absorbent below ambient pressure.

4. The method as set forth in claim 1, wherein said method further comprises performing a step of reducing the pressure from operating to near atmospheric pressure after said feed gas has been passed through said absorbent bed to generate a blowdown gas.

5. The method as set forth in claim 4, further including a step of removing said feed gas, remaining after said step of reducing, from the void spaces in the absorbent bed by using one of a vacuum pump and purging with air.

6. The method as set forth in claim 4, further comprising recycling said blowdown gas by returning said blowdown gas to a feed gas compressor.

7. The method as claimed in claim 4, wherein said step of reducing occurs between consecutive activations of said steps of passing and exposing.

8. The method as set forth in claim 4, where said reducing step includes purging said blowdown gas in a same direction as said feed gas passes through said absorbent in said step of passing.

9. The method as set forth in claim 1, wherein at least about 90% of said carbon dioxide present in said feed gas is removed when said method is operated at pressures only slightly above atmospheric pressure.

10. The method as set forth in claim 1, wherein after said feed gas is passed through said absorbent bed, less than about 1% of said gas comprises carbon dioxide.

11. The method as set forth in claim 1, wherein said absorbent comprises a sodium rich clinoptilolite having the approximate chemical formula $Na_{6[Al_6}Si_{30}O_{72}]\cdot 24H_2O$.

12. The method as set forth in claim 1, wherein said clinoptilolite has a particle size of about 3.36–0.59 mm.

13. The method as set forth in claim 1, wherein said absorbent is activated by heating to between 300° C. and 400° C.

14. The method as set forth in claim 1, wherein said absorbent does not require ion exchange or pelletization before use.

15. The method as set forth in claim 1, further including a step of reducing a mixing of air and methane prior to performing said step of exposing for reducing an amount of an explosive gas mixture being formed.

16. The method as set forth in claim 15, wherein said reducing step includes evacuating a container containing said absorbent bed of said feed gas.

17. A method for separating carbon dioxide from methane, comprising:

providing a column containing activated clinoptilolite that preferentially absorbs carbon dioxide over methane;

conducting a step of drying a gas mixture comprising from about 1% to about 75% carbon dioxide with the remaining balance being substantially methane, thereby obtaining a dry gas mixture;

conducting a step of supplying, subsequent to said step of drying, said gas mixture to said column, wherein a pressure of said gas mixture in said column is between about 1 to about 200 psig, for thereby enhancing an absorption of $CO_2$ from said dry gas, yielding a resulting gas having a greater proportion of methane than the gas mixture;

conducting a step of reducing the pressure in said column to approximately atmospheric pressure and directing the gas exiting said column so that said gas is mixed with an additional amount of the gas mixture to be fed to said column in said supplying step, leaving a resulting gas in said column;

purging said column of said resulting gas remaining therein by contacting said column with a stream of dry air, thereby producing a purged gas mixture; and directing said purged gas mixture into an intake side of a feed gas compressor feeding said gas mixture to said column in said step of supplying.

18. The method as set forth in claim 17, further including an evacuating step for reducing a mixing of air and methane for thereby reducing an amount of an explosive gas mixture being formed;

wherein said evacuating step removes a negligible proportion of $CO_2$ from said absorbent.

19. A method for bulk separation of carbon dioxide from methane, comprising:

providing a feed gas comprising a mixture of methane and carbon dioxide, wherein a content of the carbon dioxide in the feed gas is in a range of 1% to 75%;

pressurizing, in a range of approximately 1–200 psig, a volume of a container with a stream of the feed gas passing therethrough, wherein said container includes an absorbent bed having an absorbent that comprises a clinoptilolite for absorbing carbon dioxide preferentially over methane in said feed gas, and wherein said absorbent is substantially resistant to desorption of carbon dioxide through depressurization;

depressurizing said volume to near atmospheric pressure;

exposing said absorbent bed to a stream of dry air so that a majority of carbon dioxide removed by said absorbent is removed with said stream of dry air.

20. A method for separating carbon dioxide from methane, comprising:

providing a feed gas comprising a mixture of methane and carbon dioxide;

performing a step of passing said feed gas through a container having an absorbent bed that includes an absorbent that comprises an effective amount of clinoptilolite to absorb carbon dioxide in said feed gas preferentially over methane;

performing a step of removing from said absorbent bed at least some of the absorbed carbon dioxide by exposing said bed to a stream of dry air passing through said container at near atmospheric pressure, said stream exiting said container;

performing a step of detecting when a rate of change of an amount of carbon dioxide in said stream is approximately zero when said stream exits said container; and repeating said step of passing, removing, and detecting.

21. A method for separating carbon dioxide from methane, comprising:

providing a feed gas comprising a mixture of methane and carbon dioxide;

performing a step of passing said feed gas through a volume of a container having an absorbent bed therein, said bed including an absorbent that comprises an effective amount of clinoptilolite to absorb carbon dioxide in said feed gas preferentially over methane, for thereby obtaining less than approximately 10% carbon dioxide in a resulting gas exiting said container; and exposing said absorbent bed to a stream of approximately 50 to 150 times the volume of said container of dry air passing through said container at near atmospheric pressure for removing a sufficient amount of carbon dioxide from said absorbent so that said step of passing can be effectively repeated.

22. A method for separating carbon dioxide from methane, comprising:

providing a feed gas comprising a mixture of substantially methane and carbon dioxide, wherein a content of the carbon dioxide in the feed gas is in a range of 1%–75%;

performing a step of passing said feed gas through a container having an absorbent bed that includes an absorbent that comprises an effective amount of a clinoptilolite to absorb carbon dioxide in said feed gas preferentially of methane; and removing from said absorbent bed approximately half or more of the carbon dioxide absorbed by the absorbent by exposing said bed to a stream of dry air at near atmospheric pressure wherein said stream has a volume in a range of 50–150 volumes of said container.

23. The method as set forth in claim 22, wherein said absorbent bed experiences insignificant desorption at substantially all pressure reductions, wherein a resulting pressure is approximately greater than or equal to 1 psia.

24. The method as set forth in claim 22, wherein said method further comprises reducing the pressure from said step of passing to near atmospheric pressure, thereby generating a blowdown gas.

25. A method for separating carbon dioxide from methane comprising:

performing a step of pressurizing with a feed gas mixture of methane and carbon dioxide in a container to a pressure above atmospheric pressure, wherein said container has an absorbent that absorbs carbon dioxide preferentially over methane;

releasing from said container a gas mixture having a reduced amount of carbon dioxide in comparison to said feed gas mixture, while substantially maintaining said pressure in said container;

performing a step of blowing down said pressure in said container when one or more predetermined conditions are detected;

first purging a remainder of said gas mixture from said container;

passing through said absorbent in said container, a stream of dry air for removing carbon dioxide from said absorbent, wherein said stream removes a majority of the carbon dioxide that is removed from said absorbent;

second purging said container of the dry air in preparation for repeating said step of pressurizing.

26. A method as set forth in claim 25, wherein said step of blowing down includes detecting, as said one or more predetermined conditions, a gradual increase in $CO_2$ in said gas mixture being released from said container.

* * * * *